Sept. 7, 1965    A. DI SETTEMBRINI    3,205,287
METHOD AND APPARATUS FOR MANUFACTURING HOLLOW PLASTIC ARTICLES
Filed May 25, 1962    2 Sheets-Sheet 2

United States Patent Office 3,205,287
Patented Sept. 7, 1965

3,205,287
METHOD AND APPARATUS FOR MANUFACTURING HOLLOW PLASTIC ARTICLES
Antoine Di Settembrini, 42 Petit Val, Sucy-en-Brie, France
Filed May 25, 1962, Ser. No. 197,625
Claims priority, application France, May 26, 1961,
862,961, Patent 1,297,890
1 Claim. (Cl. 264—94)

This invention relates to methods for manufacturing thermoplastic hollow articles.

The hitherto known methods consist mainly in perforating, for example by means of a hollow needle either stationary or actuated by a ram, the wall of the thermoplastic blank and subsequently injecting into said blank through the aperture resulting from said perforation the fluid under pressure utilized for blowing the blank.

It is the primary object of this invention to simplify this method by eliminating the mechanical perforation members.

To this end, the method of manufacturing hollow thermoplastic articles according to this invention, which consists in placing a blank in the plastic state into the impression of a mold and blowing a fluid under pressure into said blank in order to cause same to take the shape of the mold impression, is characterized in that the blank of the mold impression, is characterized in that the blank placed into the mold is pinched at the desired location in order to weaken the thermoplastic material in the pinched region, and that a stream of fluid under pressure is injected in the direction of the thus weakened region, so that the previously weakened pinched region is smashed in by the jet of fluid under pressure which penetrates into the blank and blows the article to the desired hollow shape.

The blowing method according to this invention is advantageous notably in that it permits of dispensing with the customary perforation members which are costly and/ or fragile. The blowing of plastic hollow articles can be performed without difficulty by simply forming in the mold one or more orifices disposed at suitable locations, for example in the vicinity of the pinching region.

Various forms of embodiment of the invention will now be described with reference to the attached drawings, wherein.

Figure 2:
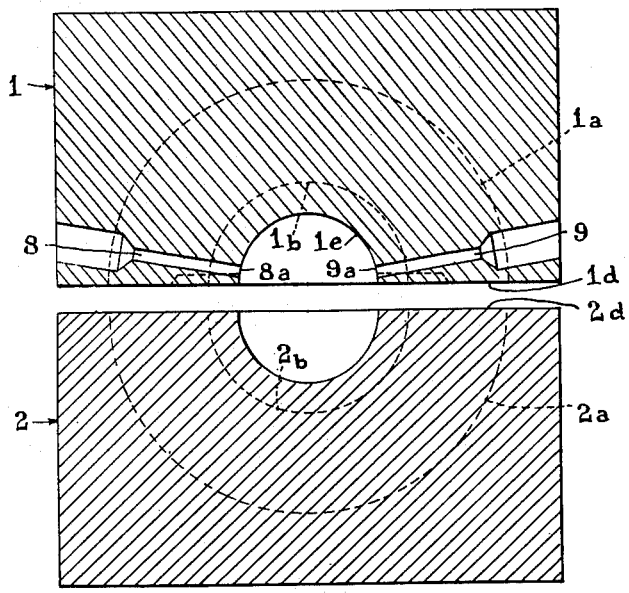
FIGURE 2 is a cross section taken upon the line II—II of FIG. 1 showing the two halves of the apparatus.

As shown in FIG. 2, the apparatus according to this invention comprises two mold halves 1, 2 in which hollow impressions 1a, 2a are formed, these impressions representing the hollow contour of the hollow article or body to be manufactured, which in this example is a bottle. The neck of the bottle manufactured by means of the mold illustrated is formed in narrower portions 1b and 2b of the impression.

Figure 1:
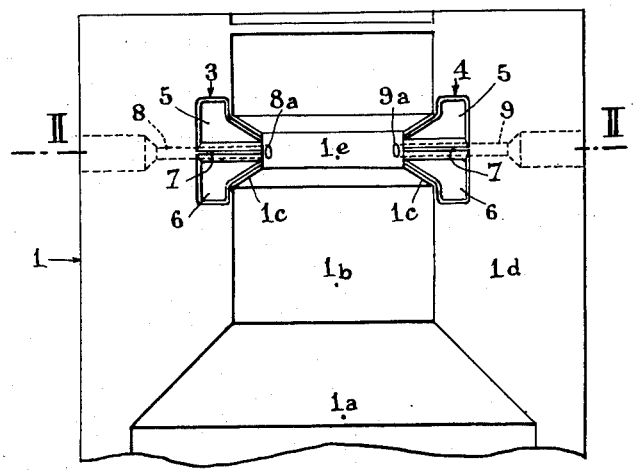
FIGURE 1 illustrates diagrammatically in fragmentary elevation the apparatus in which the blowing step is performed.
Figure 3:
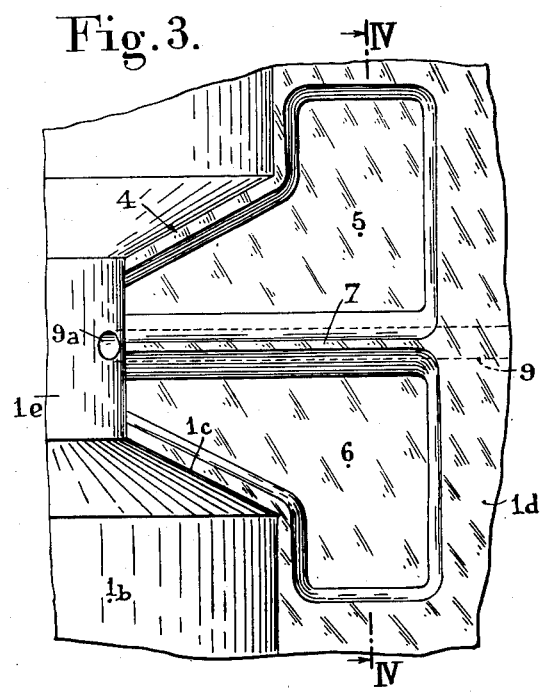
FIGURE 3 is an eletvational view showing on a larger scale the blank pinching device provided in the mold half illustrated in FIG. 1.
Figure 4:
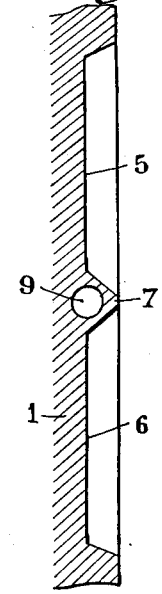
FIGURE 4 is a section taken upon the line IV—IV of FIG. 3.

According to this invention, one of the mold halves is provided, at suitable locations, with one or more devices for pinching the thermoplastic tubular blank, the function of these devices consisting in facilitating the subsequent blowing operation. In FIG. 1 it is clear that the mold half 1 is shaped, in the vicinity of the neck portion 1b of the impression, to constitute two pinching devices 3, 4. One of these devices, namely the device 4, is shown on a larger scale in FIGS. 3 and 4.

The pinching device 4 consists of the extension 1c of the joint plane 1d of mold half 1, this extension 1c projecting into the neck portion 1b of the mold impression. In the joint plane 1d a pair of recesses 5, 6 are formed, a V-sectioned rib 7 being formed between these recesses and extending to the end of extension 1c.

Under these conditions, when the thermoplastic tubular blank is placed in the neck portion 1b of the impression, and the two mold portions 1, 2 are moved toward each other, the blank is clamped between the two pinching devices 3, 4 provided in the mold half 1 and the joint plane 2d of the other mold half 2. As a result, this thermoplastic material is crushed and forced into the recesses 5, 6 to constitute retaining ears.

Associated with the pinching devices 3, 4 are blowing passages 8, 9 respectively which open through orifices 8a and 9a respectively into the narrower portion 1e of the mold impression, this neck portion being bound by the extension 1c of the joint plane 1d. In the specific form of embodiment illustrated the axes of the blowing passages 8, 9 are disposed in a common transverse plane and housed in the ribs 7 formed between the recesses 5 and 6.

Upon completion of the pinching of the thermoplastic tubular blank, fluid under pressure is injected through the orifices 8a and 9a and the properly directed fluid jets perforate the wall of the blank and blow the latter.

Figure 5:
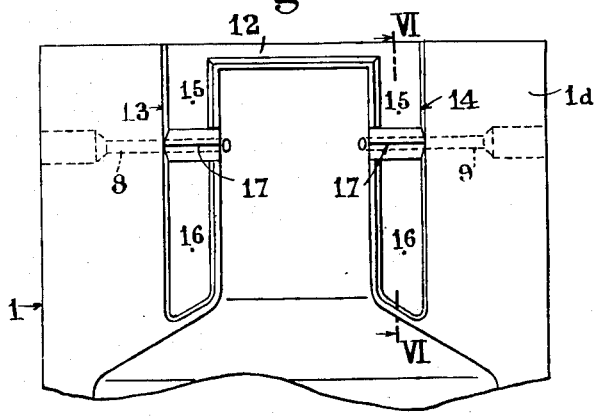
FIGURE 5 is a fragmentary elevational and diagrammatic view showing an alternate embodiment of the pinching device of the mold half.
Figure 6:
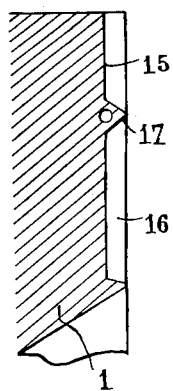
FIGURE 6 is a section taken upon the line VI—VI of FIG. 5.

In FIGS. 5 and 6 the pinching devices 13 and 14 differ somewhat from those illustrated in the preceding figures. In this alternate embodiment, however, each pinching device comprises a V-sectioned rib 17 having recesses 15, 16 formed on either side in the joint plane 1d. However, the recesses 15 which are nearer to the edge of the mold, in these devices 13 and 14, communicate with each other at their upper portion through a hollow portion 12 of the mold half. The blowing passages 8, 9 are disposed as in the preceding example.

Figure 7:
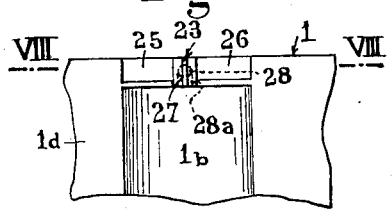
FIGURE 7 is a fragmentary elevational and diagrammatic view showing another modified embodiment of the pinching device.
Figure 8:
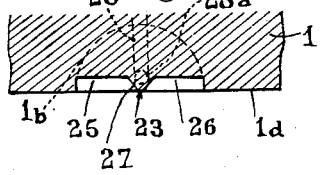
FIGURE 8 is a section taken upon the line VIII—VIII of FIG. 7.

In FIGS. 7 and 8 of the drawings the mold half 1 comprises a single pinching device 23 formed at the upper portion of neck 1b and at the limit of the mold half. It compreses two portions 25, 26 which are hollow in relation to the joint plane 1d of the mold half, and between these hollow portions 25, 26 a V-shaped rib 27 is formed. In this case the axis of rib 27 lies in a longitudinal plane. Beneath the rib 27 is a blowing orifice 28a of a blowing passage 28 housed preferably in the rib 27 and opening into the neck portion, in the vicinity of the rib.

On the other hand it will be readily appreciated by anybody conversant with the art that the different forms of embodiment shown and described herein with reference to the attached drawings are given by way of example only and should not be construed as limiting the invention as many modifications and variations may be brought thereto without departing from the spirit and scope of the invention as set forth in the appended claims.

Thus, notably, both two mold halves 1 and 2 may be provided with blowing orifices, although only the mold half 1 is shown as comprising such orifices in the examples illustrated and described.

What I claim is:

A method of shaping thermoplastic hollow articles in the impression of a mold, which comprises the steps of placing a blank in a plastic state between two mold halves having a joint plane, pinching said plastic blank in said joint plane in order to weaken the thermoplastic wall of the blank in the pinching region, and subsequently injecting a jet of fluid under pressure in the direction of the weakened wall of the blank whereby said weakened wall is smashed through and the plastic blank is blown and caused to take the shape of the mold impression.

References Cited by the Examiner

UNITED STATES PATENTS

| | | | |
|---|---|---|---|
| 2,750,624 | 6/56 | Coates et al. | 18—5 |
| 2,789,934 | 4/57 | Busbach | 264—94 |
| 2,886,853 | 5/59 | Herman et al. | 264—94 |
| 3,038,198 | 6/62 | Schaar. | |
| 3,069,722 | 12/62 | Kato | 18—5 |
| 3,081,489 | 3/63 | Jackson et al. | 18—5 |

FOREIGN PATENTS

| | | |
|---|---|---|
| 233,019 | 2/61 | Australia. |
| 1,244,286 | 9/60 | France. |

ROBERT F. WHITE, *Primary Examiner.*

MICHAEL V. BRINDISI, *Examiner.*